United States Patent [19]
Watson

[11] Patent Number: 5,151,812
[45] Date of Patent: Sep. 29, 1992

[54] PASSIVE ENERGY DIAMETRIC SCANNER

[76] Inventor: Troy M. Watson, 5672 E. Kelso St., Tuscon, Ariz. 85712

[21] Appl. No.: 753,315

[22] Filed: Aug. 30, 1991

[51] Int. Cl.$^5$ ............................................ G02B 26/10
[52] U.S. Cl. .................... 359/201; 359/203; 359/216
[58] Field of Search ................. 359/201, 203, 216–219

[56] References Cited

U.S. PATENT DOCUMENTS

| | | | |
|---|---|---|---|
| 3,813,140 | 5/1974 | Knockeart | 359/218 |
| 4,008,371 | 2/1977 | Barron | 359/216 |
| 4,938,551 | 7/1990 | Matsumoto | 359/216 |

Primary Examiner—Janice A. Howell
Assistant Examiner—Don Wong
Attorney, Agent, or Firm—J. E. McTaggart

[57] ABSTRACT

Diametric scanning of a forward target region, wherein each scan line proceeds from an edge of a circular field of view through the center to the opposite edge while the scan angle is advancing. Processing of line scan data for target acquisition and tracking is facilitated by rotational translation, since each successive diametrically-scanned line is incrementally related to the previous line. Scanning progresses uniformly and continuously. An optical path between a target area and an energy sensor is intercepted by a first angled reflector of a dual reflector assembly, rotating around the optical path axis as part of a rotor having a peripheral ring with a single gap. Rotating about the axis is a ring fitted with an array of reflecting facets. The energy beam is redirected by a first reflector of the dual reflector assembly through the gap and reflected by a facet moving past the gap and thence to the sensor via a second angled reflector. In one embodiment, curvature of the reflective surface on each facet results in repetitive displacement of the targeted object point in the field of view, scanning the field of view in a rotating pattern of diametric scan lines while keeping the image of the targeted object point focused on the sensor. In another embodiment, elementary-sized facets on the facet ring scan the first image diametrically as it rotates within the gap. The resultant intensity modulation of the reflected and redirected beam is detected.

14 Claims, 9 Drawing Sheets

PASSIVE ENERGY DIAMETRIC SCANNER

FIELD OF THE INVENTION

The present invention relates to electro-optic scanners and more particularly to scanning systems and related enabling mechanisms suited to target detection, tracking and acquisition within a generally circular or conical field of view, based on sensing energy, typically radiating passively from a target object, typically IR (infrared) but not excluding visible light and microwaves. The invention is suited to such purposes as: FLIR (forward-looking infrared) sensing; detection, tracking and acquisition of heat-generating objects in space; and examining passive radiation patterns on a surface from a distance, e.g. ground surveillance from aircraft or spacecraft.

BACKGROUND OF THE INVENTION

A conventional technique of energy pattern scanning employs a raster-scan format analogous to the usual scanning of a television screen. The line/frame raster scan format is widely used for its compatibility with two-dimensional detector arrays such as charged-coupled-device (CCD) type; however there are a number of inherent drawbacks and disadvantages. Elaborate gating techniques are required, for example to handle line and frame rate retrace. Simple image rotation presents complex and time-consuming processing tasks to the operating hardware and software. The scanned field is inherently square or rectangular although the region of interest is more likely to be circular, thus scanning the corner regions generally represents wasted or low-yield effort. Furthermore, with raster scan, the resolution is inherently constant over the entire scanned region, although in a great deal of actual practice, the requirement for resolution increases strongly toward the center of the region where target acquisition activity tends to concentrate; for this reason, one raster scan approach of known art provides "super-scan", an auxiliary system for effectively increasing the scanning density by a factor of several times over a small region in the center of the field of view, for enhancing target acquisition and tracking resolution. Such a two-step (or multi-step) system imposes burdens of complexity in hardware and supporting software.

Polar scanning offers an attractive alternative from several viewpoints including increased center resolution, continuous scanning progression without discontinuity, and inherent ease of data processing, e.g. data interpretation relating to simple rotation.

PRIOR ART

Polar scanning has been proposed and utilized in particular specialized types of field applications, usually in some type of radial mode, as exemplified in well known radar and tracking techniques utilizing a rotating directional antenna.

U.S. Pat. No. 3,916,196 to Thomson exemplifies radial type scanning: a 360 degree annular zone is scanned by an first reflecting plane, inclined in front of a fixed optical lens and rotating at twice the speed of a second mirror assembly having a pair of reflecting planes at right angles to each other in the optical path leading to a fixed linear array of IR detector elements.

A nearly hemispheric field of view is provided according to U.S. Pat. No. 4,703,179 to Motooka, wherein a multi-detector, multi-sided focal plane array, rotating on a platform, provides for varying the shape of the arrays from a sector of a circle to rectangular.

A form of sector scanning is also shown in U.S. Pat. No. 4,188,531 to Pusch.

A form of circular scanning is disclosed in U.S. Pat. No. 3,554,628 to Kennedy.

OBJECTS OF THE INVENTION

It is a primary object of the present invention to provide an improved scanning system, for target detection, tracking and acquisition in a conical three dimensional region as observed from the vertex or for examining a flat two-dimensional target area from an offset distance; in such a scanning system it is a particular object to provide that the system resolution increases proportionally toward the center of the scanned region.

It is a further object to provide scanning of a circular region as opposed to a rectangular region.

It is a still further object that all scanned lines can be treated and processed in a similar manner so as to facilitate the processing of image data, particularly in the presence of image rotation.

A still further object is to provide a scanning method in which line-to-line scanning progresses uniformly and continuously without disruption.

SUMMARY OF THE INVENTION

The foregoing objects have been met by the present invention in a diametric scanner wherein scanning of a circular field of view is performed in a continuous incremental manner along successive diametric paths each starting at a point at the circumference of the field of view and proceeding through the center to the opposite edge of the field, each path being separated from the previous one by a predetermined angle of rotation, throughout a full 360 degree working field. As an improvement over providing two or more discrete steps of raster scanning density, diametric scanning as taught by the present invention inherently provides a smooth gradation of line resolution ranging from maximum at center to minimum at the periphery of the field of vision. Tracking is readily accomplished by comparing each incoming working field against a reference field which can be stored in memory in the form of radial co-ordinates, simplifying both hardware and software requirements.

Diametric line scan in accordance with this invention may be implemented by a co-axial pair of rotary assemblies rotating at different rates acting on the transmission of a focussed energy beam such as a light or IR beam. A first rotor is fitted with a pair of transverse angled reflectors and a peripheral ring with a single gap; the second rotor is fitted with a circular array of specially shaped reflective facets which interact with the gap to cause deflection at an intermediate focal point in the energy path between a front end energy-collecting lens system and an energy-sensitive cell located at a final focal point. The target object point is thus caused to move across the field of view in a manner to scan the field diametrically, i.e. each scan line starts at a point at the edge of the circular field of view and proceeds through the center to the opposite edge of the field, and on each successive line the angle is advanced by a predetermined increment.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
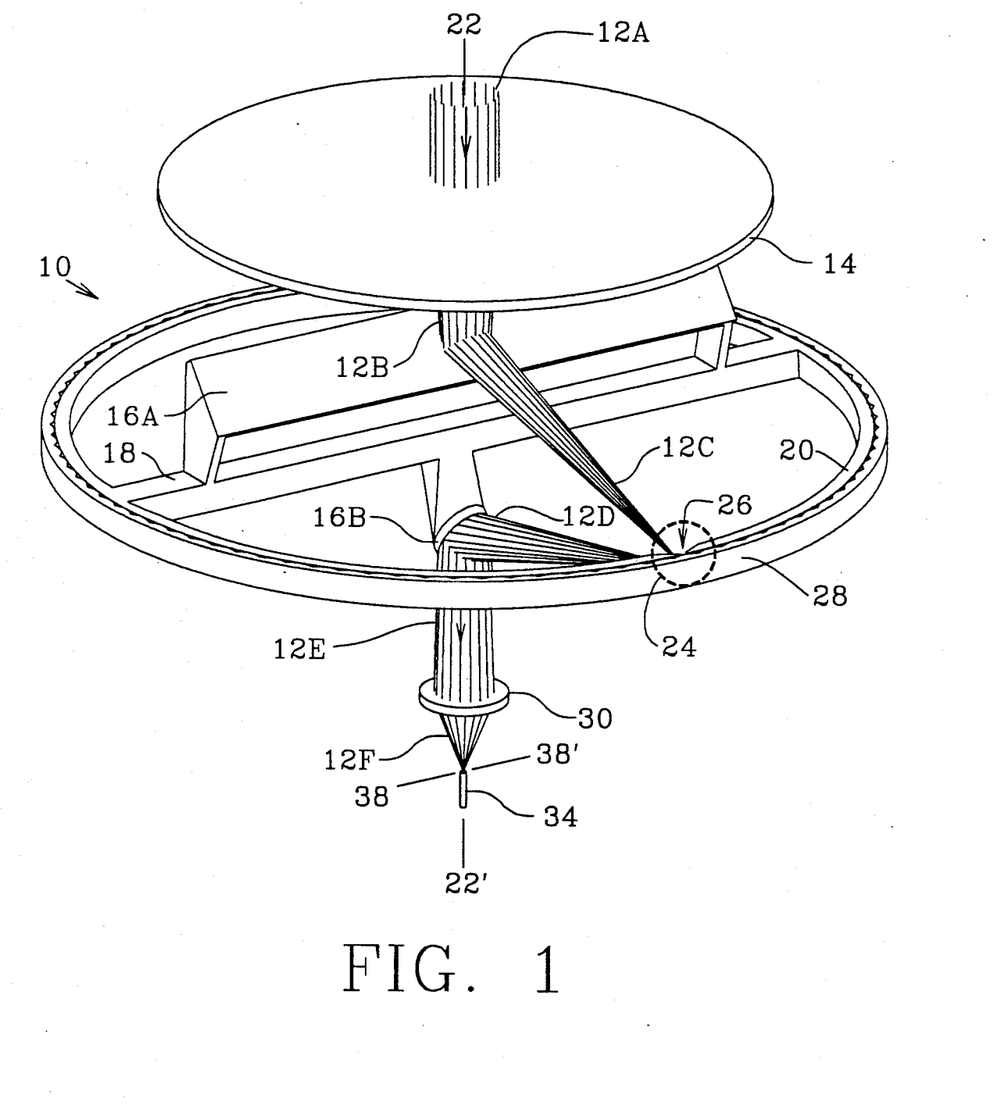
FIG. 1 is a three dimensional view of the functional elements of a first embodiment of the diametric scanner of this invention.

In FIG. 1, the functional elements of a scanner embodiment 10 of this invention are shown in a three dimensional view. An incoming beam 12A contains energy such as infrared, radiating from a central targeted object point in a designated field of view located at some distance above the region shown in FIG. 1. Beam 12A is collected and converged by a front-end lens system 14. The converging beam 12B is redirected by a first angled flat reflector 16A which is mounted along with a similar second angled flat reflector 16B via a structural strut 18 to an aperture ring 20, forming a rotor assembly which is made rotational about axis 22-22', which is also the central axis of incoming beam 12A and converging beam 12B. The redirected beam 12C converges to an intermediate focal plane at a point centered within the region indicated by the dashed circle 24, where beam 12C traverses a narrow vertical gap 26 in ring 20. A facet ring 28 is disposed concentrically about the aperture ring 20 and is made to be independently rotational about axis 22-22'. Ring 28 carries an array of curved reflective facets around its inner surface in close proximity to the outer surface of aperture ring 20. (Note: an enlarged top view of the gap 26 and facets 36 may be seen in FIGS. 3A and 3B). In the immediate vicinity of the focal plane, the beam 12C passes through the gap 26 in ring 20 and is reflected by a facet of ring 28 to form a diverging beam 12D which is redirected by reflector 16B such that the redirected beam 12E becomes centered on axis 22-22' (assuming a centered facet-to-gap alignment, i.e. neutral deflection at the intermediate focal plane). Beam 12E is acted upon by final lens system 30 to form final beam 12F which converges to a focal point on axis 22-22'. Located at this focal point is an energy-sensing cell 34, which for IR sensing applications is typically a controlled-low-temperature Dewar type IR detector, connected to appropriate amplification and processing electronics. At this final focal point, the optical system provides a final optical image of a small portion of the field of view, limited in size by reflector 16B and lens 30. The circular active element of cell 34 is dimensioned to select from this image a major central circular portion which may be considered an image of an elementary targeted object point in the field of view.

With neutral facet deflection the cell 34 would sense a targeted object point located at the center of the field of view. Any instantaneous value of deflection by the current active facet from this neutral condition will have the effect of shifting the incoming beams 12A and 12B along the longitudinal axis of reflector 16A, in effect shifting the location of the targeted point object away from its initial central location in the field of view, while its image is kept focussed on the cell 34.

Rings 20 and 28 may be supported and driven on the outer periphery by rollers coupled to conventional motor drive means (not shown). The aperture ring 20 is made to rotate at a speed different from that of the facet ring 28, thus the facets of ring 28 continuously move across the gap 26 of ring 20, causing a recurrent deflection about the above described undeflected condition. In effect this shifts the position of the targeted point object in the field of view in a scanning pattern of diametric paths which pass through the center point and are angularly incremented by the rotation of the rotor carrying aperture ring 20 and reflectors 16A and 16B.

Figure 2:
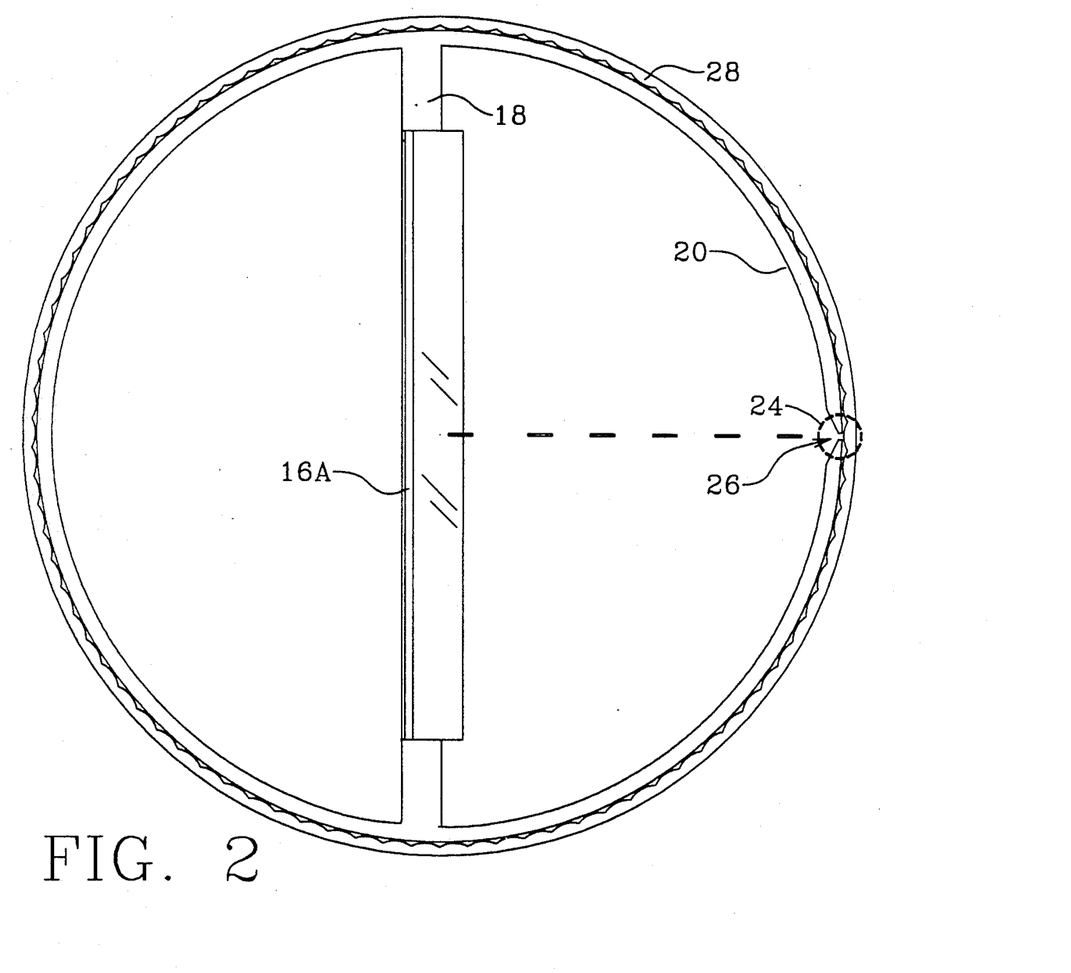
FIG. 2 is a plan view of the scanner embodiment of FIG. 1.

FIG. 2 shows a plan view of the dual rotor assembly showing facet ring 28 surrounding aperture ring 20 which also carries the angled reflector assembly 16, attached via strut 18. The region where the energy beam is acted upon by the gap 26 in ring 20 and the active facet of ring 28 is indicated by dashed circle 24. An enlarged top view of this region may be seen at FIG. 7A; here the gap is seen to be centered on the facet, i.e. in the neutral condition considered in the above descriptions.

Figure 3A:
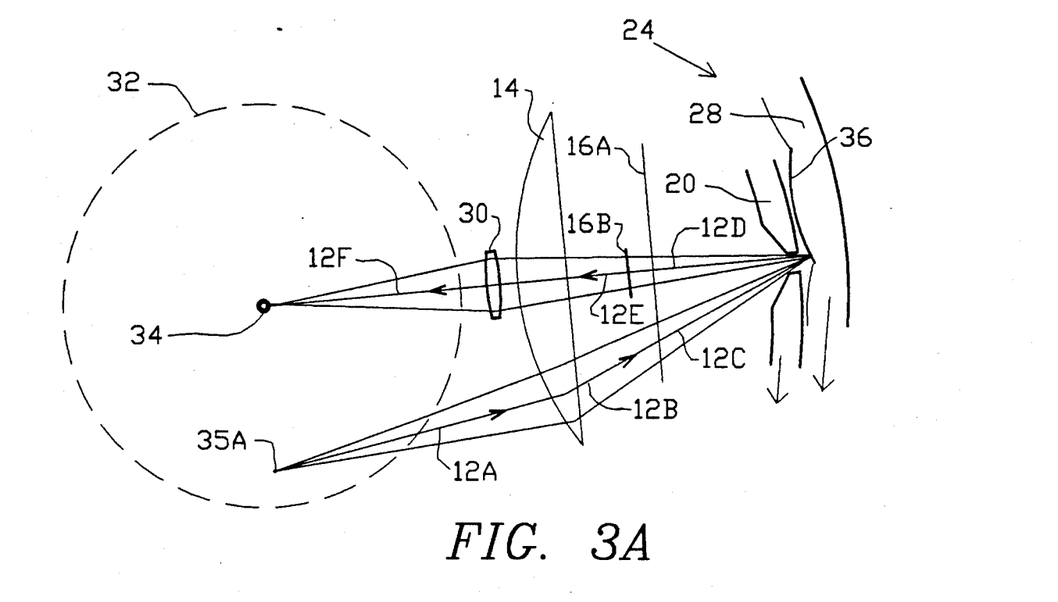
FIGS. 3A and 3B illustrate the process of scanning a diametric line across the field of view.
Figure 3B:
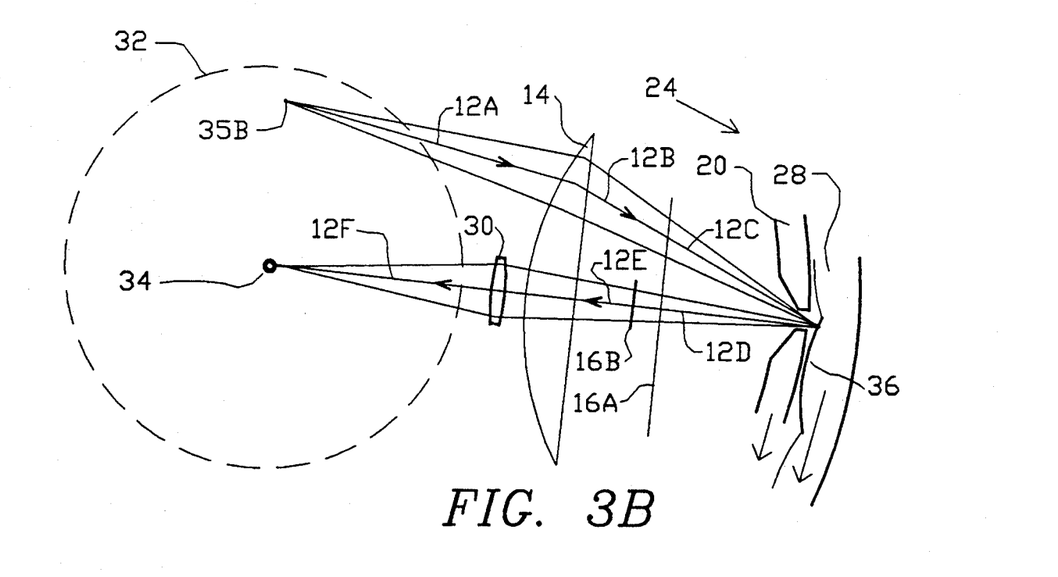

FIGS. 3A and 3B illustrate the interaction of the gap of ring 20 and the facet 36 of ring 28 at two points in the process of scanning a single diametric line of the target field of view: near the start and near the end of the line respectively. In these figures, for simplification and clarity, the perpendicular redirection of the energy beams by the dual reflector assembly is not shown.

In FIG. 3A, as rotating ring 28 has just started to move facet 36 past the gap of ring 20, the angle of reflection at this point causes the target object point 35A to be located near the lower edge of the field of view 32 as shown, since this is the location where the energy from point 35A ultimately becomes focussed onto cell 34 after traveling the path indicated: beam 12A, collected by lens 14, converged to beam 12B, redirected by reflector 16A as beam 12C, reflected by facet 36 at the focal plane to become beam 12D, redirected by reflector 16B to lens 30 and finally reconverged and focussed onto cell 34.

In FIG. 3B, ring 28, rotating at twice the speed of ring 20, has moved facet 36 twice as far as the gap as has moved so that facet 36 is almost fully past the gap. At this point, the angle of reflection has reversed such that the target object point 35B is now located near the upper edge of the field of view 32 as shown, having moved across the field in a diametric scanning path.

As rotation continues, the above-described sequence will be repeated on the next adjacent facet, to scan the next diametric line, and so forth, each successive scanned diametric line being rotated from the previous one by the angle of resolution chosen for the system, as determined by the number of facets and speed ratio between the two rotors.

Without special compensation, the diametric scan lines traced by the simplified scanning mechanism shown would not be perfectly straight but would have a slight geometric curvature. This curvature may be reduced by increasing the number of facets, i.e. the overall scan density, or it may be minimized by special compensation measures, for example by specially shaping the surfaces on the angled redirecting reflectors to be curved instead of straight. Such compensation is generally applied by modifying the scanning path toward the ends of each scan line, i.e. at the edge of the field of view.

Figure 4:
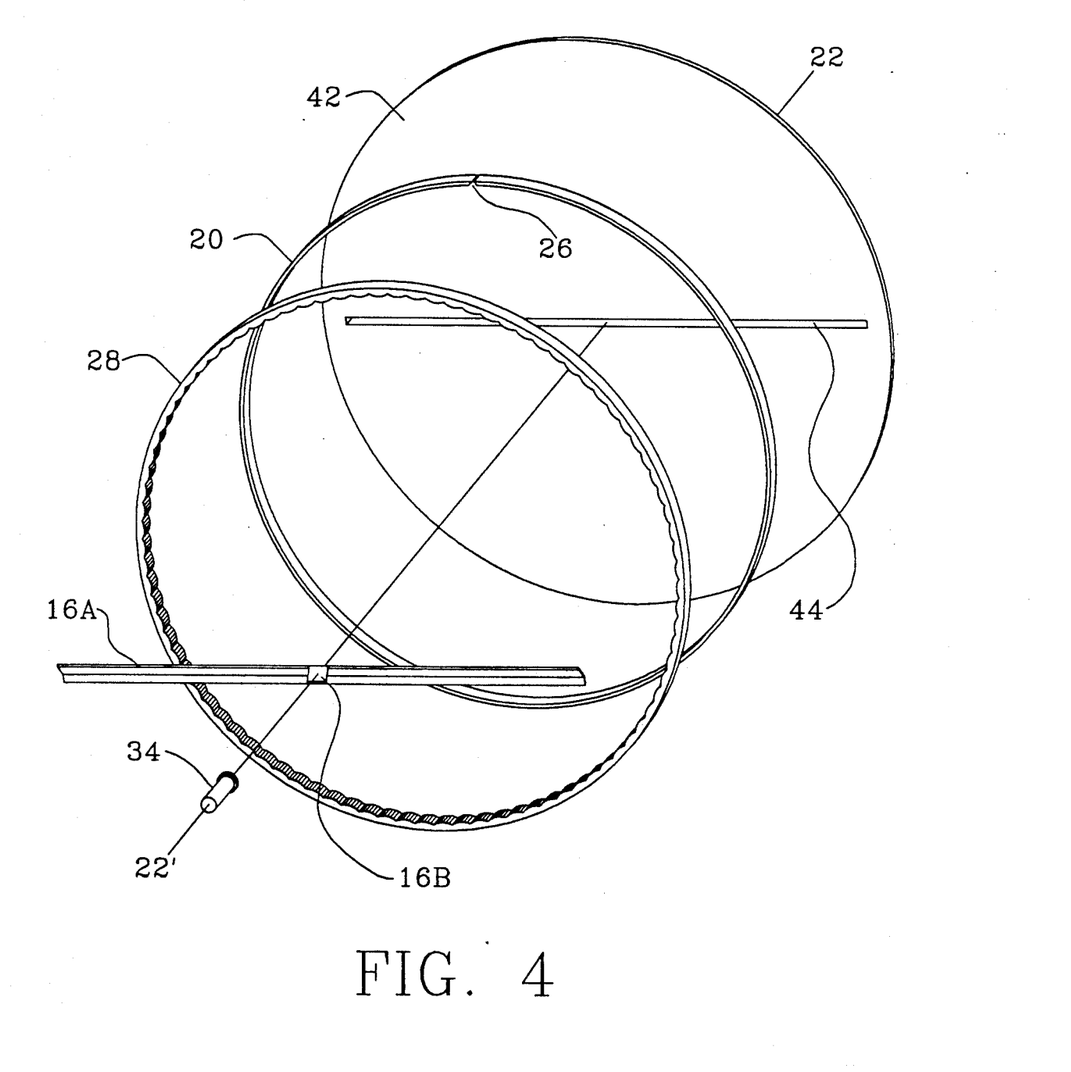
FIG. 4 is a three dimensional exploded view of a scanning mechanism similar to that of FIG. 1 with the addition of a rotating aperture disk.

FIG. 4 is a three-dimensional exploded view of key elements of a scanning system showing aperture ring 20, angled reflectors 16A and 16B, facet ring 28 and sensor cell 34 (which may include a final converging lens, not shown) functionally similar to those described above in connection with FIG. 1. Additionally FIG. 4 shows a rotating disk 42 having an elongated slot aperture 44 placed in front of an optional input lens (not shown, but corresponding to lens 14, FIG. 1). Disk 42, made to rotate at the same rate as aperture ring 20 and reflectors 16A and 16B, acts as a shield to extraneous incoming energy, allowing through the slot aperture 44 only the desired energy from a diametric line of the field of view which is being scanned. The purpose of disk 42 is to improve the system's signal-to-noise ratio by preventing extraneous energy and stray reflections from reaching sensing cell 34.

Figure 5:
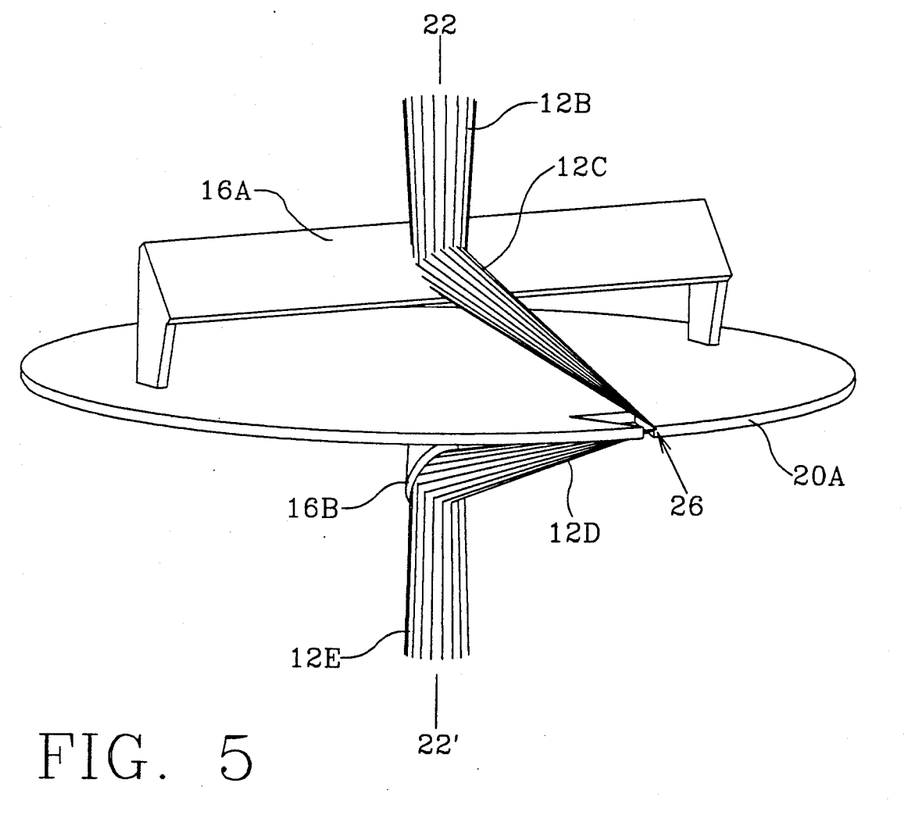
FIG. 5 is a three dimensional view of an aperture ring rotor assembly similar to that utilized in FIG. 1 with the addition of an isolation baffle between the two reflectors.

FIG. 5 is a three-dimensional view of a specially shielded aperture ring dual reflector rotor assembly which may be used as a supplement or alternative to using the aperture disk of FIG. 4 in enhancing signal-to-noise ratio by suppressing extraneous energy and stray reflections. Aperture ring 20A is made as a solid disk having a triangular opening behind gap 26 as shown, made to the minimal size required to clear the incoming and outgoing energy beams traversing gap 26 around the central axis 22-22' as indicated.

Figure 6:
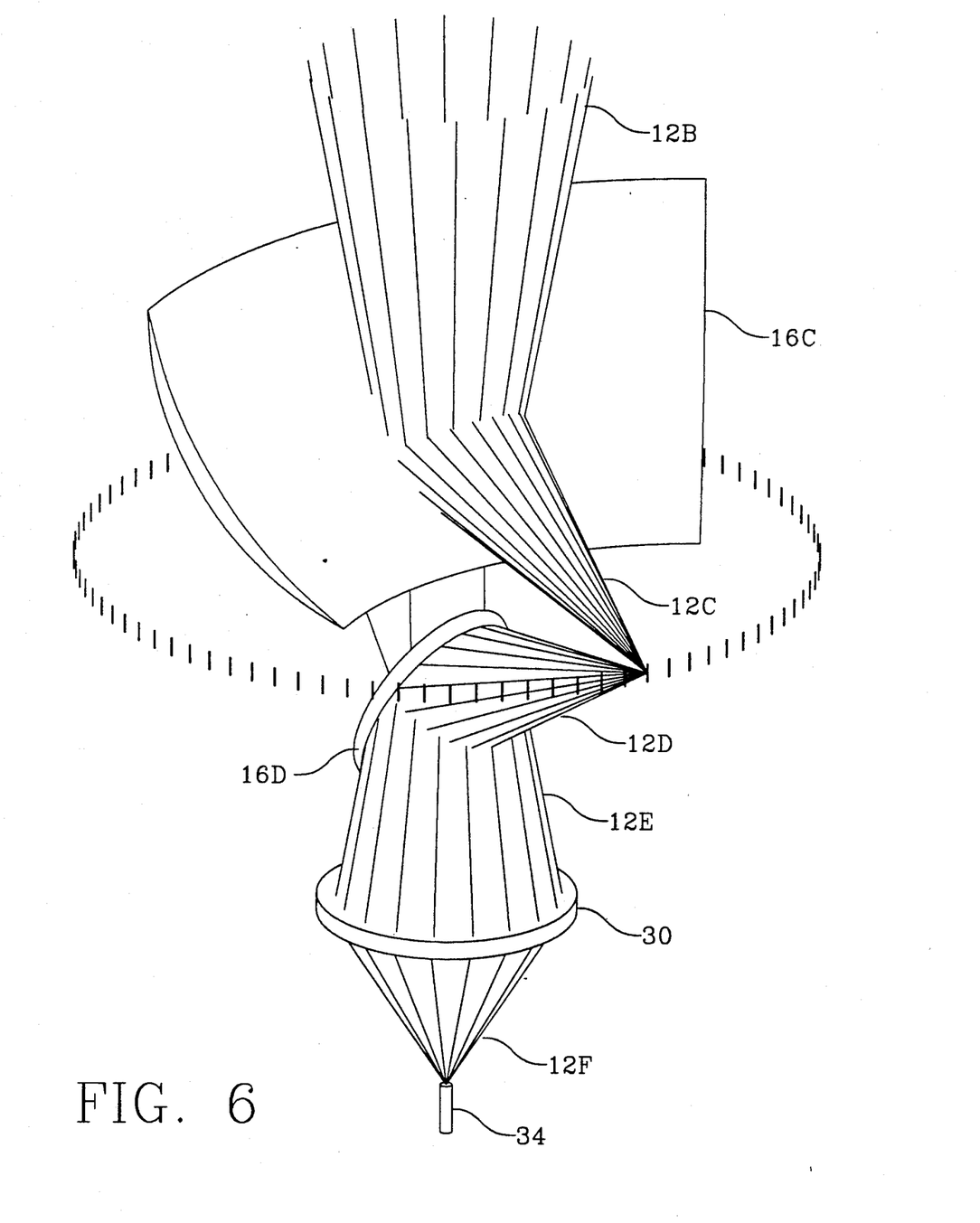
FIG. 6 is a three dimensional view of a pair of curved rotating reflectors along with associated energy beams, as alternatives to the flat reflectors of FIG. 1.

FIG. 6 shows the functional elements of a scanning system similar to that of FIG. 1 except for the dual reflector assembly where one or both reflectors are made with a concave curvature in each axis as shown in reflector 16C. Such curvature causes the reflectors to act as lenses and thus interact optically with the incoming and final lens systems, thus adding a further degree of flexibility in overall optical system design. The reflector curvature may also be modified to compensate for curvature of the diametric scan lines, as discussed above in connection with FIGS. 3A and 3B.

Figure 7A:
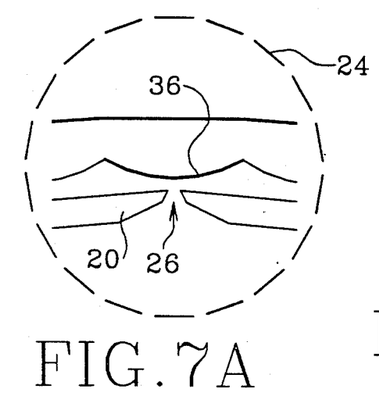
FIG. 7A is an enlarged top view of a portion of the scanner of FIG. 1 in the region of the aperture ring gap, showing the facet ring with convex facets.

FIG. 7A is an enlarged top view of the circled region 24 of FIG. 1 showing a convex facet 36 opposite gap 26.

Figure 7B:
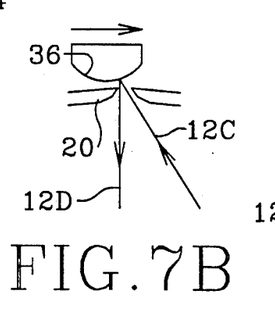
FIG. 7B shows the reflection angle of the convex facets of FIG. 7A near the start of a scan line.
Figure 7C:
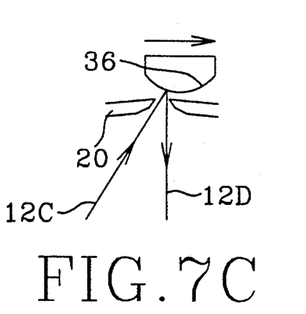
FIG. 7C shows the reflection angle of the convex facets of FIG. 7A near the end of a scan line.

In FIGS. 7B, 7C, 8B and 8C the reflected beam 12D, shown leaving the facet 36, represents the mean axis of the secondary beam which is focussed onto the cell, and is considered to remain in a fixed direction, while the incoming beam 12C shown approaching the facet is considered to be the mean axis of the incoming beam from the object point in the field of view which is being scanned instantaneously. FIGS. 7B and 7C illustrate the deflecting effect of the convex facet 36 of FIG. 7A on the incoming beam 12C as the facet ring carrying facet 36 rotates relative to the aperture ring 20 in the direction indicated by the arrows.

In FIG. 7B, near the start of a scan line, the path of the incoming beam 12C is seen to be from the right, while in FIG. 7C, near the end of the scan line, the path is from the left; thus, with convex facets, the effective scanning deflection moves in a direction opposite the rotation of the rings.

Figures 8A, 8B:
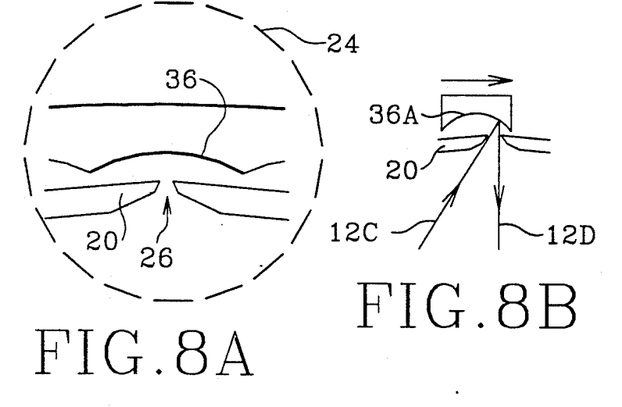
FIG. 8A is an enlarged top view of a portion of a scanner, of the general type shown in FIG. 1, in the region of the aperture ring gap, showing the facet ring with concave facets.
FIG. 8B shows the reflection angle of the concave facets of FIG. 8A near the start of a scan line.

FIG. 8A is an enlarged top view of the circled region 24 of FIG. 1 showing a concave facet 36A opposite gap 26 as an alternative to the convex shape of facet 36 in FIGS. 7A-C.

Figure 8C:
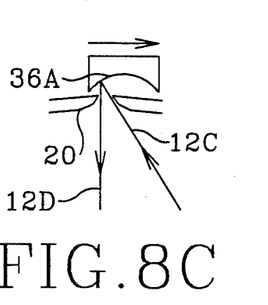
FIG. 8C show the reflection angle of the concave facets of FIG. 8A near the end of a scan line.

FIGS. 8B and 8C show the deflecting effect of the concave facet of FIG. 8A on the incoming beam 12C as the facet ring carrying facet 36A rotates relative to the aperture ring 20 in the direction indicated by the arrows.

In FIG. 8B, near the start of a scan line, the path of the incoming beam 12C is seen to be from the left, while in FIG. 8C, near the end of the scan line, the path is seen to be from the right; thus, with concave facets, the effective scanning deflection moves in the same direction as the rotation of the rings.

The diverging/converging effect of convex/concave reflector shapes are to be taken into account as part of the overall optical system analysis and design.

Figure 9A:
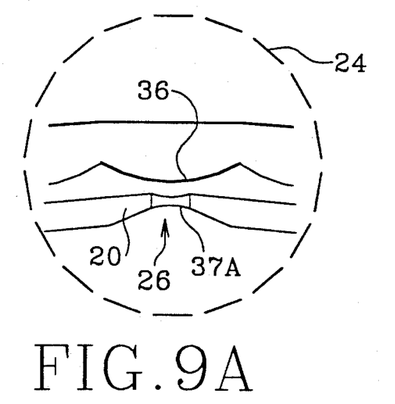
FIGS. 9A and 9B show lens elements inserted into the aperture ring gap.
Figure 9B:
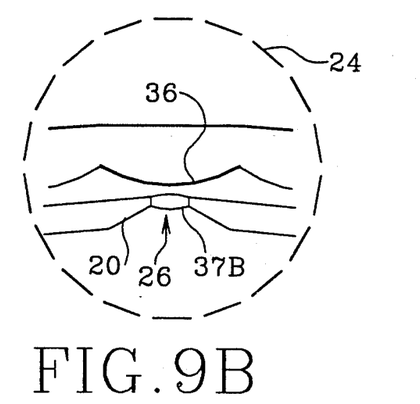

FIGS. 9A and 9B show a modified aperture ring gap 26 with alternative additional focusing elements 37A and 37B inserted to provide greater flexibility in the optic design of the system. FIGS. 9A and 9B show respectively a concave element 37A and a convex element 37B: these elements act to alter the location of the focal point in the vicinity of facet 36.

Figure 10A:
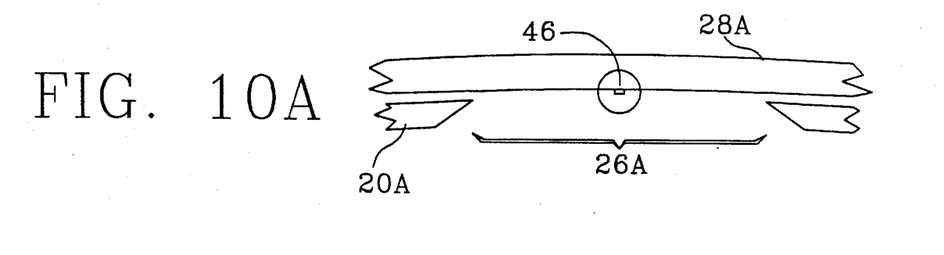
FIG. 10A is an enlarged top view of a portion of a scanner, of the general type shown in FIG. 6, in the region of the aperture ring gap, showing an alternative embodiment having a widened gap in the aperture ring and a narrow reflector stripe at each facet.
Figure 10B:
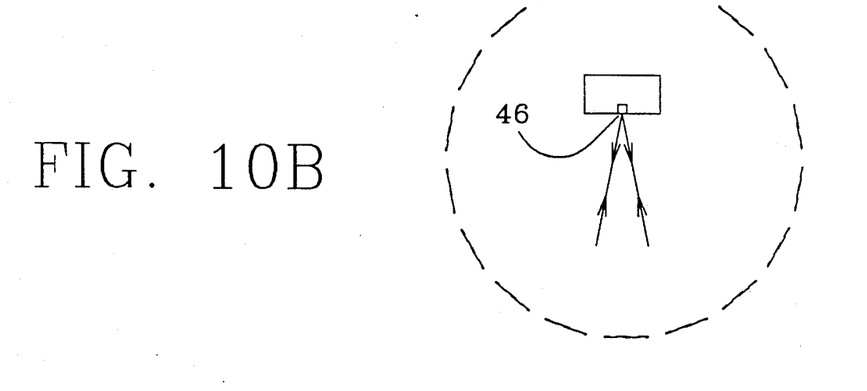
FIG. 10B shows an energy beam being reflected from a narrow reflector stripe of FIG. 10A.

FIGS. 10A-10E illustrate an alternative wide gap approach to which the scanning system of FIG. 1 may be adapted, as in FIG. 10A, by increasing the size of the gap 26A on ring 20A to approximate one scan line, and providing on ring 28A, rather than facets, an array of narrow stripes 46 spaced one scan line apart. The optical system is adapted to provide an intermediate optical image of the field of view filling the width of the gap 26A, and within this image, as indicated in FIG. 10B, only the small portion striking reflective stripe 46 is reflected; the portions of the inner circumference of ring 26A between stripes 46 are made to have a flat black non-reflective surface. Since the stripes 46 move along a smooth circular path defined by the constant inner radius of ring 28A, the location of the final image on the sensor cell will remain constant. The cell and its associated final optical system (lens 30) are to be designed to project at least a substantial portion of the image onto the active region of sensing cell 34, which senses the variations in instantaneous reflected energy intensity as stripe 46 scans through successive diametric paths of the target area field of view.

Figure 10C:
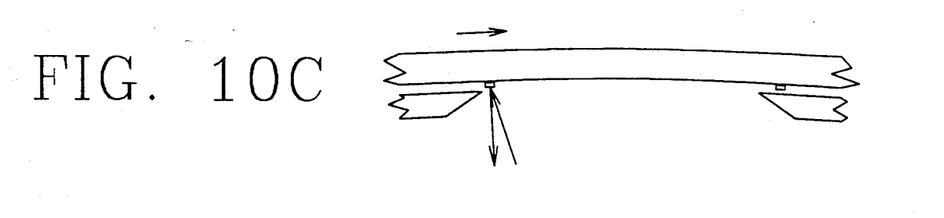
FIGS. 10C–10E show the reflection angle of the narrow reflector stripe of FIGS. 10A and 10B near the start, at the midpoint, and near the end of a scan line.
Figure 10D:
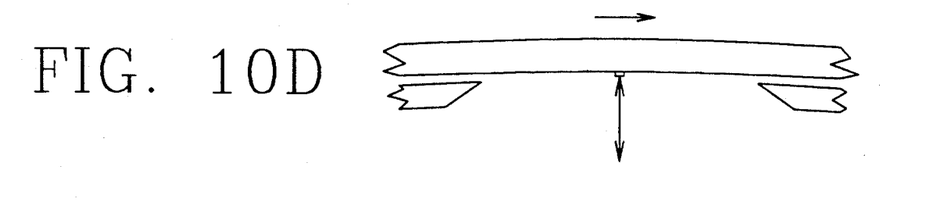
Figure 10E:
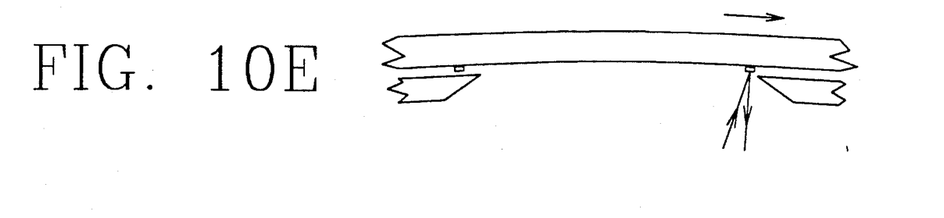

FIGS. 10C-10E illustrate the start, midpoint and end points, respectively, of a line of scanning being performed by reflective stripe 46, corresponding to a diametric scan line across the target field of view.

The concept illustrated in FIGS. 10A-10E should be regarded as exemplary with the understanding that the concept encompasses making the reflective stripe 46 concave or convex in shape, further altering the final focal point of beam 12F.

Figure 11A:
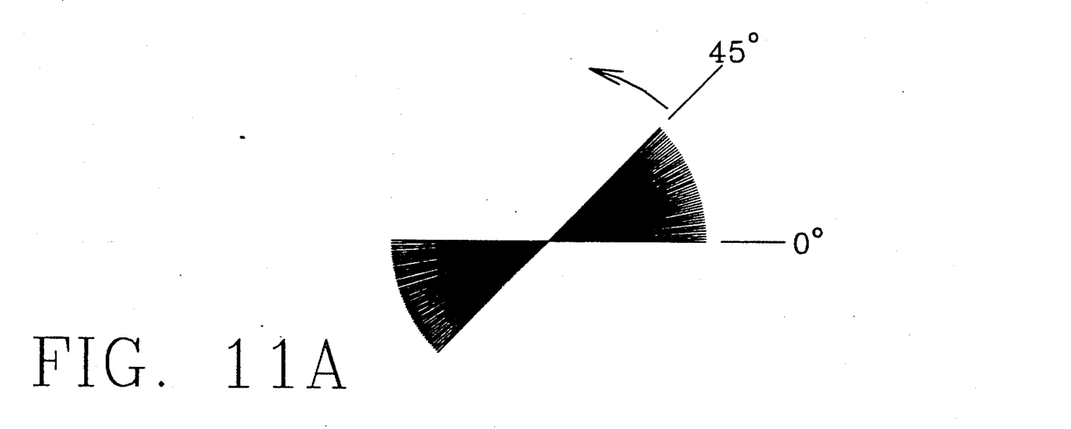
FIG. 11A illustrates the scan lines of a first quarter portion in the development of a diametrically scanned frame.
Figure 11B:
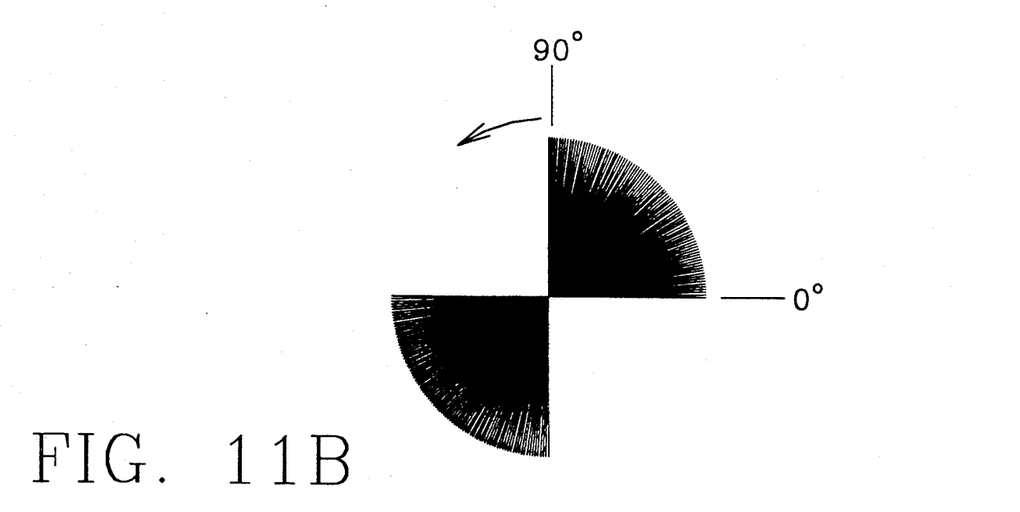
FIG. 11B illustrates the scan lines of a first half portion in the development of a diametrically scanned frame.
Figure 11C:
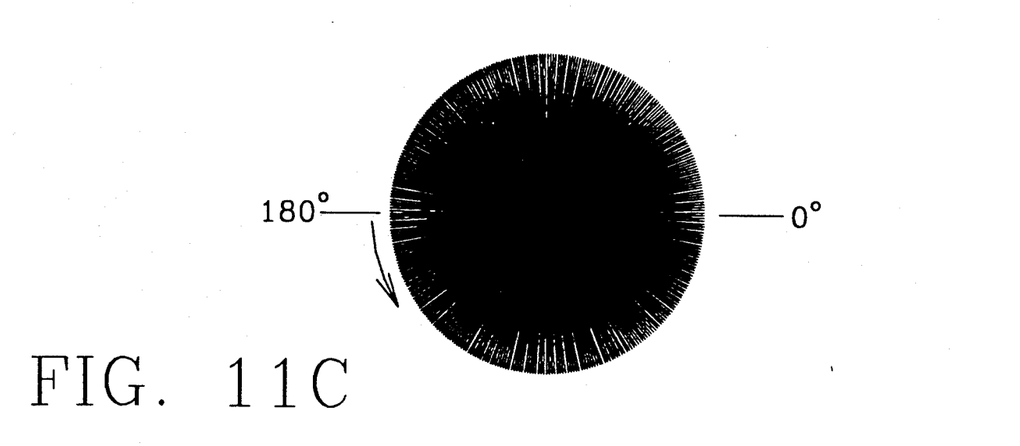
FIG. 11C illustrates the scan lines in a full diametrically scanned frame.

FIGS. 11A-11C illustrate three stages in the development of a complete frame of diametrically-scanned lines in accordance with the above described embodiments of the present invention. In this example, the facet ring has 90 facets and rotates at 3600 r.p.m. while the aperture ring rotates at one quarter of this rate, i.e. 900 r.p.m., thus the facet ring advances 4 degrees for each degree of aperture ring advancement. An entire frame is scanned in 180 degrees of diametric scanning while the aperture ring rotates a half revolution and the facet ring rotates two revolutions. Scan lines will be 1 degree apart and the frame rate will be 1800 frames per minute, i.e. 30 frames per second.

FIG. 11A illustrates diametric scanning of the first quarter of a frame, having proceeded from a 0 degree angle to a 45 degree angle.

FIG. 11B illustrates scanning of the first half of a frame, having reached a 90 degree angle.

FIG. 11C illustrates diametric scanning of a full frame, having reached a 180 degree angle, whereupon diametric scanning will continue with no disruption, proceeding to the first line of the next frame, which will retrace (in reverse direction) the initial scan line which started at 0 degrees, thus the initial line data will be updated (or replicated if there has been no target movement).

The diametric scanning process during one complete revolution, i.e. 360 degrees, of the aperture ring may be thought of as a complete field made up of the two frames each scanned in a half revolution; however each frame is complete in itself, providing a full set of scan data from the field of view. The reversal of scan direction on alternate frames tends to balance out any display response distortions or anomalies.

While the r.p.m. numbers used above are in a typical range for certain conventional scanning mechanisms of known art, it should be apparent that the numbers chosen in actual practice will become a matter of design choice based on particular constraints and requirements of the particular mission.

There may be instances which favor a different speed ratio between the two rotor units. Generally, processing software and hardware will be simplified with even multiples, preferably powers of two, while odd multiples will result in a form of interlaced diametric scanning.

The concept of diametric scanning is readily adaptable to a wide range of field applications. The field of view is readily altered through the selection and design of the input lens system in accordance with known optical technology: basically diametric scanning is inherently compatible and readily applicable through the full geometric range of conical fields of view, ranging from a very narrow beam in the order of 1 degree, through more commonly utilized viewing angles in the order of 20 to 90 degrees, extending to wide angles up to the 180 degree hemispherical limit. With special optics the concept could be extended beyond 180 degrees up to the 360 degree spherical limit: such coverage would be particularly useful in aircraft or spacecraft since it would provide virtually all-around sensing on a single logically-oriented display screen with maximum resolution in an aimed direction, typically forward, displayed centrally on a circular screen, decreasing to minimum resolution in the opposite direction, displayed peripherally on the screen.

Diametric scanning in accordance with this invention may be adapted to sense passive energy within a range of wavelengths which can be processed using optical techniques, including infrared, visible light and microwaves. Selectivity within the usable range is exercised by the choice of the sensor cell for the spectrum portion of interest.

Time delay integration (TDI) can be achieved within the scope of this invention by placement of a plurality of sensor cells linearly along the virtual image scan path whereby a plurality of points in space is sampled and then integrated to form a single point by individually delaying the output of each sensor cell a pre-determined amount of time.

It is to be considered within the scope of this invention and within the competence of those skilled in optics to further facilitate, enhance and/or optimize the present subject matter diametric scanning system by incorporating additional optical elements at strategic points in the energy beam to modify the convergence or divergence of the energy beam and/or to apply well-known standard optical aberration corrective techniques.

While the illustrative embodiments are directed to the detection of passive energy, the optical reflection and deflection mechanisms as disclosed herein for purposes of energy reception could be readily adapted to active diametric scanning of a target region with a transmitted energy beam for example in the manner of a "flying spot scanner". In place of the sensor cell utilized in the present passive energy embodiments, an active scanner would utilize an energy sourcing device such as a laser; additional return energy sensing means would be required such as a staring sensor system or a synchronized diametric scanner of the type described herein.

The present invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A diametric line scanner for sensing radiant energy intensity within a circular forward target field of view, comprising:
   a first lens system adapted to collect radiant energy from the field of view and transmit the collected energy along a convergent primary beam so as to provide a first focal point at which a targeted object point in the field of view is focussed;
   reflecting means in the vicinity of the first focal point adapted to reflect radiant energy of the primary beam and thus produce a divergent reflected secondary beam,
   a second lens system adapted to converge the secondary beam into a convergent final beam path so as to provide a second focal point at which the point in the field of view is focussed;
   a radiant-energy-sensitive cell located concentrically with the secondary beam at the second focal point, adapted to input to storage and processing means an electrical signal proportional to instantaneous energy intensity sensed; and
   energy selection means, disposed between said first lens system and said second lens system and associated with said reflecting means, adapted to selectively expose said cell to radiant energy from the field of view in a manner to scan the field of view for localized energy level in continuous successive diametric scan lines, each starting at an edge of the field of view and progressing through a central point therein to an opposite edge, each scan line being advanced angularly about the central point by a predetermined angle.

2. The diametric line scanner as defined in claim 1 wherein:
   said radiant-energy-sensitive cell is made to have a designated sensitive region sized to correspond to an elementary targeted object point in the field of view;
   said energy selection means comprises optical deflecting means adapted to selectively alter said reflecting means in a manner to effectively move a targeted object point about a mean axis in the field of view so as to effectively scan the field of view in a continuous series of angularly advancing diametric scanning paths.

3. The diametric line scanner as defined in claim 2, further comprising:
   a first rotor unit, disposed between said first lens system and said second lens system, adapted to rotate concentrically about an axis common to said first lens system and said second lens system, receiving rotational drive from first drive means at a predetermined rotational velocity;
   an aperture ring of said first rotor unit defining a circular outer circumference, the aperture ring having a gap defining a discontinuity extending along a portion of the circumference;
   a first angled reflector, being a part of a dual reflector unit attached to the first rotor unit, adapted to intercept the primary beam between the first lens system and the first focal point, and to redirect the primary beam in an approximately perpendicular direction such as to locate the first focal point approximately within the gap, such that upon rotation of the first rotor unit, the first focal point is caused to orbit the axis in a circular path while remaining in a fixed disposition relative to the rotating gap;
   a second rotor unit, having a circular facet ring disposed concentrically immediately outside said aperture ring, adapted to rotate concentrically about the common axis, receiving rotational drive from second drive means at a predetermined multiple of the rotational velocity of the first rotor unit;
   a plurality of identical reflective facets, disposed side by side in a circular array around an inner circumference of said facet ring, adapted to sequentially traverse the gap in a manner to expose a continuous succession of said facets to radiant energy of the primary beam so as to produce by reflection the divergent reflected secondary beam, thus constituting said reflecting means;
   a second angled reflector, being a part of the dual reflector unit attached to the first rotor unit, adapted to intercept a predetermined portion of the reflected secondary beam and to redirect the secondary beam in an approximately perpendicular direction so as to center the redirected secondary beam about the common axis, such that predetermined uniform shaping of the facets and rotation of the facets about the axis relative to the rotation of the gap along with the dual reflector assembly, cause the selected targeted object point to be diametrically scanned within the field of view.

4. The diametric line scanner as defined in claim 3 wherein:
   each of the facets is generally rectangular and is shaped to have two opposite straight edges at adjacent facet interfaces, parallel with the common axis, and two curved edges defining a convex reflective surface facing inwardly from the facet ring toward the common axis and extending across at least a major portion of the width of the facet between the two opposite straight edges; and
   the gap is made to have a width which is only a fraction of the facet width.

5. The diametric line scanner as defined in claim 3 wherein:
   each of the facets is generally rectangular and is shaped to have two opposite straight edges at adjacent facet interfaces, parallel with the common axis, and two curved edges defining a concave reflective surface facing inwardly from the facet ring toward the common axis and extending across at least a major portion of the width of the facet between the two opposite straight edges; and
   the gap is made to have a width which is only a fraction of the facet width.

6. The diametric line scanner as defined in claim 3 further comprising elements, disposed in said gap, having a varying influence on passing energy.

7. The diametric line scanner as defined in claim 3 wherein:
   each of the facets is generally rectangular and is shaped to have two opposite edges at adjacent facet interfaces, faces, parallel with the common axis, defining a flat reflective surface facing inwardly from the facet ring toward the common axis and extending across at least a major portion of the width of the facet between the two opposite straight edges; and
   the gap is made to have a width which is only a fraction of the facet width.

8. The diametric line scanner as defined in claim 3 wherein:

each of the facets is generally rectangular and is shaped to have two opposite straight edges at adjacent facet interfaces, parallel with the common axis, defining a flat reflective surface facing inwardly from the facet ring toward the common axis.

9. The diametric line scanner as defined in claim 3 wherein said first angled reflector and said second angled reflector are made to have a flat reflective working surface.

10. The diametric line scanner as defined in claim 3 wherein at least of one said first angled reflector and said second angled reflector is made to have a curved reflective working surface.

11. The diametric line scanner as defined in claim 3 wherein said second angled reflector is made to be substantially smaller in size than instantaneous extents of the total energy beam reflected from said facets so as to exclude unwanted peripheral energy while effectively delivering wanted energy from a targeted point onto said cell.

12. The diametric line scanner as defined in claim 3 wherein said first rotor unit further comprises a circular energy shielding disk, disposed concentrically about the common axis, having an elongated slot, disposed symmetrically about the common axis, sized and oriented such as to allow passage of only a minimal flat beam of energy as required for diametric line scanning of the target field of view, while blocking passage of other extraneous energy.

13. The diametric line scanner as defined in claim 3 wherein the dual reflector unit is made to have a circular energy shielding plate, disposed concentrically about the common axis between said first angled reflector and said second angled reflector and extending to said aperture ring, having adjacent the gap a triangular opening sized and oriented such as to allow passage of only energy rays of the primary beam and the reflected beam as required for diametric line scanning of the target field of view, while blocking passage of other extraneous energy.

14. The diametric line scanner as defined in claim 1 wherein said energy selection means comprises:

a first rotor unit, disposed between said first lens system and said second lens system, adapted to rotate concentrically about an axis common to said first lens system and said second lens system, rotating at a predetermined velocity;

an aperture ring of said first rotor unit defining a circular outer circumference and having an gap radially traversing the ring;

a first angled reflector, being a part of a dual reflector unit attached to the first rotor unit, adapted to intercept the primary beam between the first lens system and the first focal plane, and to redirect the primary beam in an approximately perpendicular direction such that upon rotation of the first rotor unit, an image is caused to orbit the axis in a circular path in a disposition approximately within the gap of the aperture ring;

a second rotor unit, having a circular facet ring disposed concentrically immediately outside said aperture ring, adapted to rotate concentrically about the common axis, receiving rotational drive from second drive means at a predetermined multiple of the rotational velocity of the first rotor unit;

a plurality of identical reflective facets, made small in size relative to the image so as to reflect only an instantaneously selected portion of the image, said facets being disposed in a circular array at a predetermined separation distance around an inner circumference of said facet ring, set against a non-reflective background, the gap of said aperture ring being made to have a width approximating the separation distance between the facets and the image being sized to substantially fill the gap, such that, upon rotation of the facet ring, the facets are caused to be swept in succession across the image while the image is being rotated relative to the gap by rotation of the first angled reflector rotating with the first rotor unit, so as to cause the image to be reflectively scanned diametrically, whereby the divergent reflected secondary beam becomes modulated in instantaneous intensity in accordance with diametric scanning of the image;

a second angled reflector, being a part of the dual reflector unit attached to the first rotor unit, adapted to intercept the reflected secondary beam and to redirect the secondary beam in an approximately perpendicular direction, centered about the common axis, onto said cell;

whereby said first rotor unit and second rotor unit, in combination, are enabled to constitute said energy selection means, and thus enable diametric scanning of the target field of view.

* * * * *